Patented July 21, 1925.

UNITED STATES PATENT OFFICE.

JULIUS WOHLGEMUTH, OF BERLIN-CHARLOTTENBURG, GERMANY.

MEDICAL PREPARATION AND PROCESS OF MAKING SAME.

No Drawing. Application filed November 2, 1923. Serial No. 672,417.

*To all whom it may concern:*

Be it known that I, JULIUS WOHLGEMUTH, a citizen of Germany, residing at Berlin-Charlottenburg, Germany, have invented certain new and useful Improvements in Medical Preparations and Processes of Making Same, of which the following is a specification.

My invention refers to a medical preparation comprising mercury as an ingredient and which is adapted for use as a substitute for mercurial ointment. Its particular object is to provide a product of the kind aforesaid, which is full equivalent of mercurial ointment as far as its therapeutical value is considered without possessing the particular disadvantages connected with this ointment.

It is well known to those skilled in the art that mercurical ointment is the form in which mercury is mostly employed for external therapeutic application. While very effective in a general way, this ointment involves the drawback that a formation of fatty acid will gradually take place in it, which when the ointment is rubbed into the skin, gives rise to a fatty and sticky condition of the skin.

I have now discovered that if metallic mercury is mixed with talcum, for instance in the proportion of 1:2 and the mixture treated mechanically, for instance by triturating or agitating, so as to finely subdivide it, a product is obtained which is equal to mercurial ointment without possessing its drawbacks. By the means above described, I have succeded in bringing mercury into a state of subdivision so fine that the mercury can no longer be distinguished with the naked eye. The preparation thus obtained forms a fine dark grey powder. Under the microscope with 600-fold magnification the metallic mercury becomes visible in the form of minute globules of the magnitude of red blood corpuscula and less. The majority of these globules have a diameter of 0.008–0.001 mms. and less, part of them being so small that in spite of the great magnification they remain invisible.

I have further ascertained that the fine subdivision of mercury can be effected simply and quickly in a particularly effective manner by shaking or agitating mercury with talcum in the presence of hard globular bodies of an inert material such as glass beads, porcelain balls and the like. I may for instance add 2 parts of the talcum to an equal quantity of glass beads, add thereto 1 part mercury and shake the whole until the mercury has dissappeared to the naked eye. The mercury can be added to the mixture of talcum and glass beads either as a whole or gradually. Preferably the mercury is dispensed from a burette with a very fine orifice.

After the product has been prepared in this manner, the ceramic bodies or balls are separated therefrom by mechanical means such as a sieve.

The mixture of mercury and talcum powder is absolutely stable and no separation will take place even when the mixture is heated. The mixture can be converted with water into a kind of ointment or emulsion and in that state closely resembles the ordinary mercurial ointment. It is extremely well suited for being rubbed into the skin in dry or moist condition and possesses all the advantages inherent in talcum, which has an especially great dispersing capacity with regard to mercury.

I wish it to be understood that I do not desire to be limited to the exact proportions and sequences of operations described, as obvious modifications will occur to a person skilled in the art.

I claim:—

1. As a new product an intimate mixture of mercury and talcum containing mercury in microscopic subdivision, said product forming a grey, infinitely stable powder.

2. As a new product, an intimate mixture of one part mercury and two parts talcum, containing mercury in a state of microscopic subdivisi0n.

3. The method of preparing an intimate stable mixture of mercury and talcum, consisting in shaking a mixture of mercury, talcum powder and inert bodies.

4. The method of preparing an intimate stable mixture of mercury and talcum consisting in shaking one part mercury with two parts talcum powder and globular ceramic bodies.

In testimony whereof I affix my signature.

JULIUS WOHLGEMUTH.